(12) United States Patent
Ponsard et al.

(10) Patent No.: US 10,924,992 B2
(45) Date of Patent: Feb. 16, 2021

(54) METHOD FOR SELECTING, BY A SENDING DEVICE, A COMMUNICATION MODE FOR EXCHANGING DATA WITH A RECEIVING DEVICE

(71) Applicant: SIGFOX, Labege (FR)

(72) Inventors: Benoit Ponsard, Grenoble (FR); Juan Carlos Zuniga, Montreal (CA)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/462,211

(22) PCT Filed: Nov. 23, 2017

(86) PCT No.: PCT/EP2017/080239
§ 371 (c)(1),
(2) Date: May 17, 2019

(87) PCT Pub. No.: WO2018/096045
PCT Pub. Date: May 31, 2018

(65) Prior Publication Data
US 2019/0335393 A1    Oct. 31, 2019

(30) Foreign Application Priority Data

Nov. 23, 2016 (FR) ...................................... 1661392

(51) Int. Cl.
*H04W 72/00* (2009.01)
*H04W 48/20* (2009.01)
*H04W 88/06* (2009.01)

(52) U.S. Cl.
CPC ............ *H04W 48/20* (2013.01); *H04W 88/06* (2013.01)

(58) Field of Classification Search
CPC . H04W 4/023; H04W 24/04; H04W 36/0016; H04W 40/20; H04W 40/244;
(Continued)

(56) References Cited

U.S. PATENT DOCUMENTS

| | | | |
|---|---|---|---|
| 9,232,499 B1* | 1/2016 | Banerjea | H04W 72/02 |
| 2010/0097952 A1* | 4/2010 | McHenry | H04L 27/0006 |
| | | | 370/252 |
| 2014/0010133 A1* | 1/2014 | Roebke | H04W 36/14 |
| | | | 370/311 |

OTHER PUBLICATIONS

Mitola et al., "Accelerting 5G QoE via public-private spectrum sharing," IEEE Communications Magazine, May 1, 2014, pp. 77-85, vol. 52, No. 5.

* cited by examiner

*Primary Examiner* — Tu X Nguyen
(74) *Attorney, Agent, or Firm* — Im IP Law; Chai Im; C. Andrew Im

(57) ABSTRACT

A method for selecting, by a sending device of a first wireless communication system, a communication mode to be used for the first wireless communication system. The communication mode being selected from among at least two different communication modes associated with different geographical zones. The method includes listening to a second wireless communication system, the second wireless communication system being different from the first wireless communication system. The second wireless communication system having at least two different communication modes associated with different geographical zones. The communication mode used by the second wireless communication system is determined. The communication mode to be used by the first wireless communication system is selected according to the communication mode used by the second wireless communication system.

13 Claims, 2 Drawing Sheets

Figure 1:
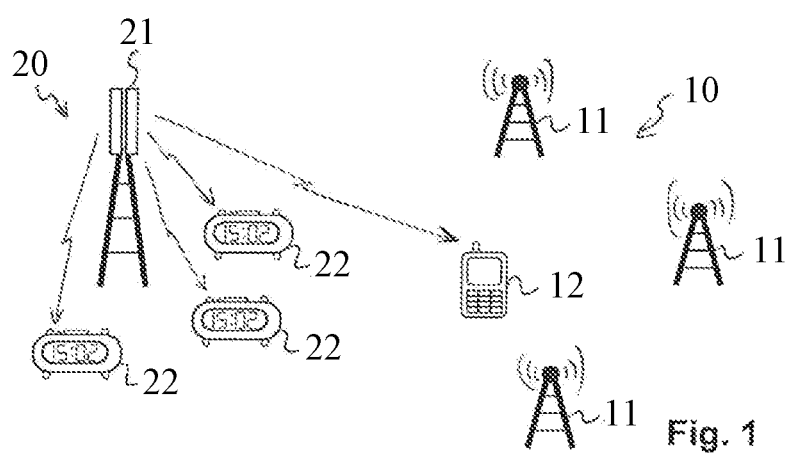

(58) Field of Classification Search
CPC ... H04W 84/18; H04W 36/18; H04W 28/021;
 H04W 56/001; H04W 4/06; H04W 8/005
USPC .............................. 455/432.1, 435.2, 435.3
See application file for complete search history.

METHOD FOR SELECTING, BY A SENDING DEVICE, A COMMUNICATION MODE FOR EXCHANGING DATA WITH A RECEIVING DEVICE

RELATED APPLICATIONS

This application is a § 371 application of PCT/EP2017/080239 filed Nov. 23, 2017, which claims priority from French Patent Application No. 16 61392 filed Nov. 23, 2016, each of which is incorporated herein by reference in its entirety.

TECHNICAL FIELD

The present invention belongs to the field of wireless communication systems. More particularly, the present invention relates to the selection, by a terminal, of a communication mode for exchanging data with base stations of a wireless communication system.

BACKGROUND OF THE INVENTION

In certain wireless communication systems, the terminals may have to support a plurality of different communication modes for exchanging data with base stations. Such communication modes are for example to be used in different respective geographic zones, in order to take into account in particular the regulatory constraints in force in each of these geographic zones.

For example, the frequency band to be used in order to emit signals, over an upstream link from the terminal to the base stations and/or over a downstream link from said base stations to the terminal, the maximum emission power of the signals, etc., can vary from one geographic zone to another, because of local regulatory constraints.

In the current wireless communication systems, for example GSM, UMTS, LTE, etc., the base stations recurrently emit a broadcast signal, also known by the name of beacon channel ("beacon" in the Anglo-Saxon literature), which is used by the terminals in order to select the communication mode to be used.

For example, the frequency band in which the broadcast signal is emitted can vary from one geographic zone to another. In such a case, the terminal successively listens to the various possible frequency bands, searching for a broadcast signal. When a broadcast signal is detected, the terminal can deduce, from the frequency band of said broadcast signal, the communication mode to be used in the geographic zone in which it is located.

In the uses of the "Internet of things" type ("Internet of Things" or IoT in the Anglo-Saxon literature), each object of daily life is destined to become a smart object, and for this purpose is equipped with a terminal of a wireless communication system. It is understood, however, that as far as possible, the cost of the terminal must not significantly affect that of the object to which it is added, in order to be able to make many objects of daily life smart objects. The electricity consumption of said terminals must also be reduced as much as possible, in order to not affect the battery life of the objects operated on batteries.

Moreover, in order to reduce the costs of implementation of a wireless communication system for IoT, it is also advantageous to use an unregulated frequency band. For example, the ISM band ("Industrial, Scientific and Medical") comprises frequency bands called free in that they can be used without prior administrative authorisation, on the condition that certain regulatory constraints are respected.

However, the emission of broadcast signals in such frequency bands can be complex due to the regulatory constraints that must be respected. In particular, the limitation in terms of temporal occupation levels exclude emitting a broadcast signal continuously. Moreover, in order to be able to increase the emission power of the broadcast signal, in order to increase the range of the base station that emits it, the temporal occupation level of the frequency band must be reduced. As a result, the silence time between two consecutive broadcast signals can be long, just like the listening time necessary in order to receive a broadcast signal from the wireless communication system.

In such a context, the successive listening to various frequency bands, searching for a broadcast signal emitted by a base station of the wireless communication system, can thus take a lot of time and, especially, be capable of leading to an electricity consumption that is too great for a smart object operated on battery.

OBJECT AND SUMMARY OF THE INVENTION

The goal of the present invention is to overcome all or a portion of the limitation of the solutions of the prior art, in particular those disclosed above, by proposing a solution that allows an emitter device of a wireless communication system, such as a terminal provided in a smart object, to select a communication mode even when no broadcast signal is emitted in said wireless communication system.

For this purpose, and according to a first aspect, the invention relates to a method for selection, by an emitter device of a first wireless communication system, of a communication mode to be used in order to exchange data with a receiver device of said first wireless communication system, said communication mode being selected from at least two different communication modes associated with different respective geographic zones. Said selection method comprises:
  listening, by the emitter device, to a second wireless communication system different than the first wireless communication system and comprising at least two different communication modes associated with different geographic zones,
  determination, by the emitter device, of the communication mode used by said second wireless communication system,
  selection of the communication mode to be used in order to exchange data with the receiver device of the first wireless communication system according to the communication mode used by said second wireless communication system.

Thus, the selection method comprises listening, by the emitter device, to a second wireless communication system different than the first wireless communication system, but which also comprises a plurality of different communication modes respectively associated with different geographic zones. "Second wireless communication system different than the first wireless communication system" means in particular that the communication modes of the second wireless communication system are all different than the communication modes of the first wireless communication system.

Moreover, the second communication system can be completely independent of the first wireless communication system, and does not require being modified for the needs of the invention which is based on a simple listening to said second wireless communication system by the emitter device. Thus, the emitter device can select a communication mode even when no broadcast signal is emitted in the first wireless communication system, by listening for example to a broadcast signal emitted in the second wireless communication system.

The emitter device then determines the communication mode used by the second wireless communication system, which depends on the geographic zone in which said emitter device is located, and deduces therefrom the communication mode to be used in order to exchange data in the first wireless communication system.

Preferably, the second wireless communication system is a unidirectional broadcast system. The existing broadcast systems have the advantage that the broadcast signals emitted can generally be decoded with reception modules that are simple and not costly to manufacture. Moreover, said broadcast signals are generally emitted very frequently, or even continuously, in such a way that the listening time necessary to receive such a broadcast signal can be extremely reduced. Furthermore, the existing broadcast systems generally serve geographic zones of large dimensions that substantially correspond to the geographic zones defined for the unregulated frequency bands, for example such as the ISM band.

In specific modes of implementation, the selection method can further comprise one or more of the following features, taken alone or in any technically possible combinations.

In specific modes of implementation, the second wireless communication system is a system for broadcasting a time signal for radio-controlled-clock synchronisation.

In specific modes of implementation, the second wireless communication system is a system for broadcasting analogue or digital television.

In specific modes of implementation, the second wireless communication system is a system for broadcasting audio via frequency modulation.

In specific modes of implementation, the second wireless communication system is a system for broadcasting a marine or aeronautic beacon.

In specific modes of implementation, the communication modes of the first wireless communication system differ by at least one of the following parameters:
frequency band of signals emitted by the emitter device,
frequency band of signals received by the emitter device,
power of signals emitted by the emitter device,
type of encoding and/or of modulation of signals emitted by the emitter device,
bit rate of data of signals emitted by the emitter device,
method for accessing a channel on which the data is exchanged between the emitter device and the receiver device.

According to a second aspect, the present invention relates to an emitter device of a first wireless communication system, comprising a communication module adapted to exchanging data with a receiver device of said first wireless communication system according to at least two different communication modes associated with different respective geographic zones. The emitter device further comprises:
a listening module configured to listen to a second wireless communication system different than the first wireless communication system and comprising at least two different communication modes associated with different geographic zones, and to determine the communication mode used by said second wireless communication system,
a control module configured to select a communication mode of the communication module according to the communication mode used by the second wireless communication system.

In specific embodiments, the emitter device can further comprise one or more of the following features, taken alone or in any technically possible combinations.

In specific embodiments, the listening module is configured to listen to a system for broadcasting a time signal for radio-controlled-clock synchronisation.

In specific embodiments, the listening module is configured to listen to a system for broadcasting analogue or digital television.

In specific embodiments, the listening module is configured to listen to a system for broadcasting via frequency modulation.

In specific embodiments, the listening module is configured to listen to a system for broadcasting a marine or aeronautic beacon.

In specific embodiments, the communication module is configured to emit ultra-narrow-band signals.

PRESENTATION OF THE DRAWINGS

The invention will be better understood upon reading the following description, given as an example that is in no way limiting, and made in reference to the drawings which show:
FIG. 1: a diagram of a first wireless communication system and of a second wireless communication system,
FIG. 2: a diagram of an example of realisation of a terminal,
FIG. 3: a diagram illustrating the main steps of a method for selecting a communication mode.

In these drawings, references identical from one drawing to another designate identical or analogous elements. For reasons of clarity, the elements shown are not to scale, unless otherwise mentioned.

DETAILED DESCRIPTION OF EMBODIMENTS

FIG. 1 schematically shows a first wireless communication system 10, comprising a terminal 12 and a plurality of base stations 11 distributed over a geographic zone.

The terminal 12 and the base stations 11 exchange data in the form of radioelectric signals. "Radioelectric signal" means an electromagnetic wave propagating in free space, the frequencies of which are comprised in the conventional spectrum of the radioelectric waves (several hertz to several hundred gigahertz).

The exchanges of data between the terminal 12 and the base stations 11 are for example bidirectional. In other words, the terminal 12 is adapted to emitting data over an upstream link to the base stations 11, and to receiving data over a downstream link from said base stations 11 to said terminal 12.

Nothing, however, excludes, according to other examples, having unidirectional exchanges, only over the upstream link or only over the downstream link. In particular, numerous uses of the IoT type involve collecting data emitted by terminals 12, and manage perfectly fine with unidirectional exchanges, only over the upstream link between each terminal 12 and the base stations 11.

In the rest of the description, in a non-limiting way, the case is considered in which the first wireless communication system 10 is ultra-narrow-band. "Ultra-narrow-band ("Ultra Narrow Band" or UNB in the Anglo-Saxon literature) means that the instantaneous frequency spectrum of the signals emitted by the terminals 12 has a frequency width of less than two kilohertz, or even less than one kilohertz. Such arrangements are particularly advantageous in that the emission of such signals can be carried out with a highly reduced electricity consumption, particularly adapted for uses of the IoT type.

Figure 2:
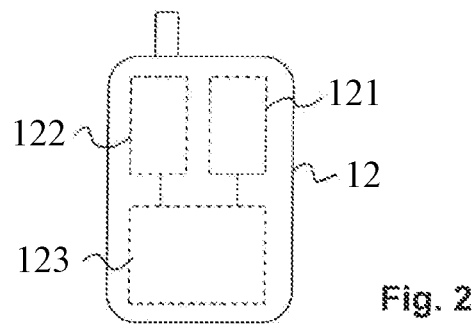

FIG. 2 schematically shows an example of realisation of a terminal 12.

As illustrated by FIG. 2, the terminal 12 comprises a communication module 121 adapted to exchanging data with the base stations 11 of the first wireless communication system 10.

More particularly, the communication module 121 supports at least two different communication modes. These two different communication modes supported by the communication module 121 differ, for example, by at least one of the following parameters:

frequency band of signals emitted by the terminal 12,
frequency band of signals received by the terminal 12,
power of signals emitted by the terminal 12,
type of encoding and/or of modulation of signals emitted by the terminal 12,
bit rate of data of signals emitted by the terminal 12,
method for accessing the upstream link or the downstream link, etc.

The various communication modes supported by the communication module 121 are to be used in different respective geographic zones, and aim for example to respect local regulatory constraints. For example, the various geographic zones correspond to:

the geographic zone bringing together the countries of Europe, of Africa and of the Middle East ("Europe Middle East and Africa" or EMEA),
the United States ("United States of America" or USA),
Japan,
the People's Republic of China ("People's Republic of China" or PRC), etc.

Thus, when the terminal 12 is in a first geographic zone (for example EMEA), the communication module 121 of said terminal 12 uses a first communication mode to exchange data with the base stations 11 distributed throughout this first geographic zone. When the terminal 12 is in a second geographic zone (for example USA), the communication module 121 uses a second communication mode to exchange data with the base stations 11 distributed throughout this second geographic zone, etc. Table 1 below gives an example of different geographic zones and of associated communications modes MC1-1 to MC4-1 for the first wireless communication system 10.

TABLE 1

Examples of geographic zones

| Geographic zone | Communication mode |
|---|---|
| EMEA | MC1-1 |
| USA | MC2-1 |
| PRC | MC3-1 |
| Japan | MC4-1 |

It is understood that the terminal 12 must be able to adapt the communication mode used by the communication module 121 in order to exchange data with the base stations 11 of the geographic zone in which it is located, in particular if the terminal 12 can be moved from one geographic zone to another and/or upon the first operation of said terminal 12 in a geographic zone not known a priori, etc.

As illustrated by FIG. 2, the terminal 12 comprises for this purpose:

a listening module 122 configured to listen to a second wireless communication system 20 also comprising at least two different communication modes associated with different geographic zones, and to determine the communication mode used by said second wireless communication system 20,
a control module 123 configured to select a communication mode of the communication module 121 according to the communication mode used by the second wireless communication system 20.

The listening module 122 and the control module 123 comprise for example one or more processors and memorisation means (magnetic hard disk, solid-state memory, optical disk, etc.) in which a computer program product is memorised, in the form of a set of program code instructions to be executed. Alternatively or in addition, the listening module 122 and/or the control module 123 comprise one or more programmable logic circuits (FPGA, PLD, etc.), and/or one or more specialised integrated circuits (ASIC, etc.), and/or a set of discrete electronic components, etc.

The listening module 122 further comprises means allowing to listen to the second wireless communication system 20, which are conventionally in the form of a radioelectric circuit comprising equipment (antenna, amplifier, local oscillator, mixer, analogue filter, etc.) known to a person skilled in the art.

In other words, the listening module 122 and the control module 123 comprise a set of means configured logically (specific computer program product) and/or physically (FPGA, PLD, ASIC, discrete electronic components, radioelectric circuit, etc.) to implement the steps of a selection method 50 described below.

Figure 3:
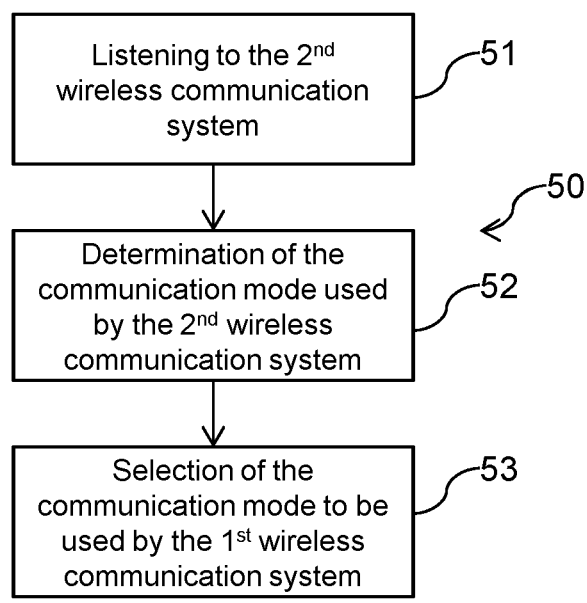

FIG. 3 schematically shows the main steps of a method 50 for selecting communication mode implemented by the terminal 12, which are:

51 listening, by the listening module 122, to the second wireless communication system 20,
52 determination, by the listening module 122, of the communication mode used by said second wireless communication system 20,
53 selection, by the control module 123, of the communication mode to be used in order to exchange data with the base stations 11 of the first wireless communication system 10 according to the communication mode used by said second wireless communication system 20.

Thus, during step 51, the listening module 122 listens to the second wireless communication system 20, which is different from the first wireless communication system 10.

Like the first wireless communication system 10, the second wireless communication system 20 comprises a plurality of communication modes respectively associated with various geographic zones.

Preferably, the second wireless communication system 20 is such that the division of the various geographic zones served is identical to that of the various geographic zones served by the first wireless communication system 10, in order to have a one-to-one correspondence between the communication modes of the second wireless communication system 20 and the communication modes of the first wireless communication system 10.

However, such a one-to-one correspondence is not always possible, insofar as the second wireless communication system 20 is preferably an existing wireless communication system, independent of the first wireless communication system 10. It is possible, in certain cases, to have a division of the second wireless communication system 20 into geographic zones that does not always allow the ambiguity as to the communication mode to be used in the first wireless communication system 10 to be removed. This will for example be the case if one of the geographic zones of the second wireless communication system 20 straddles two adjacent geographic zones of the first wireless communication system 10. In such a case, it is possible to use complementary means to completely remove the ambiguity as to the communication mode to be used in the first wireless communication system 10. Namely, it is possible to listen to at least a third wireless communication system also comprising a plurality of communication modes associated with different respective geographic zones.

In the rest of the description, in a non-limiting way, the case is considered in which the second wireless communication system 20 is a system for broadcasting a time signal for radio-controlled-clock ("Radio-Controlled Clock" or RCC in the Anglo-Saxon literature) synchronisation.

It should be noted, however, that other examples are possible for the second wireless communication system 20. According to other non-limiting examples, the second wireless communication system 20 can be any one of the following wireless communication systems, which use different communication modes associated with different respective geographic zones:
  a system for broadcasting analogue television, for which the various communication modes correspond for example to the various standards SECAM ("Séquentiel Couleur à Mémoire" in France, in the Russian Federation, etc.), PAL ("Phase Alternating Line" in Brazil, in the PRC, etc.), NTSC ("National Television System Committee" in the USA, in Canada, etc.), etc.,
  a system for broadcasting digital television, for which the various communication modes correspond for example to the various standards DVB-T ("Digital Video Broadcasting-Terrestrial" in Europe, in the Russian Federation, etc.), ATSC ("Advanced Television Systems Committee", in the USA, in Canada, etc.), ISDB ("Integrated Services Digital Broadcasting" in Japan, in LATAM, etc.), DTMB ("Digital Television Multimedia Broadcast" in the PRC, etc.), etc.,
  a system for broadcasting audio via frequency modulation, called "FM radio", in the very-high-frequency range ("Very High Frequency" or VHF in the Anglo-Saxon literature), for which the communication modes differ in particular, from one geographic zone to another, by the frequency band used,
  a system for broadcasting a marine or aeronautic beacon (for example the beacons "VHF Omnidirectional Range" or VOR, the beacons "Non Directional Beacon" or NDB, etc.), etc.

As indicated above, it is also possible, in specific modes of implementation, to listen to a plurality of wireless communication systems, different than the first wireless communication system 10, in particular in order to determine without ambiguity the communication mode to be used for the first wireless communication system 10 in the geographic zone in which the terminal 12 is located.

As illustrated by FIG. 1, a system 20 for broadcasting a time signal comprises, in a given geographic zone, a broadcasting station 21 that emits a time signal to radio-controlled clocks 22, on the basis of which said radio-controlled clocks 22 can synchronise with a time reference of the broadcasting station 21.

More generally, the system 20 for broadcasting a time signal comprises a plurality of broadcasting stations 21, distributed throughout different respective geographic zones, that use different respective communication modes. Table 2 below gives examples of stations 21 for broadcasting a time signal, as well as the geographic zones and associated communication modes MC1-2 to MC6-2.

TABLE 2

Examples of stations for broadcasting a time signal

| Name of the broadcasting station | Geographic zone | Communication mode | Carrier frequency(ies) of the communication mode |
|---|---|---|---|
| WWVB | USA | MC1-2 | 60 kHz |
| BPC | PRC | MC2-2 | 68.5 kHz |
| DCF77 | Germany | MC3-2 | 77.5 kHz |
| HBG | Switzerland | MC4-2 | 75 kHz |
| JJY | Japan | MC5-2 | 40 kHz, 60 kHz |
| MSF | United Kingdom | MC6-2 | 60 kHz |

During step 52, the listening module 122 determines the communication mode used by the second wireless communication system 20.

In general, two communication modes of the second wireless communication system 20 can differ by one or more parameters. For example, two different communication modes of the second wireless communication system 20 can differ by at least one of the following parameters:
  frequency bands of the signals exchanged in the second wireless communication system 20,
  type of encoding and/or of modulation used for the signals exchanged in the second wireless communication system 20,
  time and/or frequency rate of the signals exchanged in the second wireless communication system 20,
  format of the data included in the signals exchanged in the second wireless communication system 20, etc.

The values of the various parameters associated with each communication mode of the second wireless communication system 20 are for example memorised in a non-volatile memory of the terminal 12, in order to allow the listening module 122 to distinguish said communication modes from each other by determining the values of these parameters for received signals coming from the second wireless communication system 20.

Determining the communication mode used in the second wireless communication system 20 can, in some cases, merely require measuring certain physical parameters of the signals (frequency band used, time and/or frequency rate), but can also require going as far as extracting the data included in the signals exchanged in the second wireless communication system 20.

In the example described above in reference to table 2, in the case of a system 20 for broadcasting a time signal, the determination of the communication mode used can start by determining the carrier frequency of the time signal emitted by the broadcasting station closest to the geographic zone in which the terminal 12 is located.

For example, if the listening module 122 receives a time signal on the carrier frequency 68.5 kHz, then the communication mode used corresponds to the communication mode MC2-2 used by the broadcasting station BPC located in the PRC. If the listening module 122 receives a time signal on the carrier frequency 77.5 kHz, then the communication mode used corresponds to the communication mode MC3-2 used by the broadcasting station DCF77 located in Germany.

However, if the listening module 122 receives a time signal on the carrier frequency 60 kHz, then the communication mode used corresponds to one of the communication modes MC1-2 (WWVB in the USA), MC5-2 (JJY in Japan) and MC6-2 (MSF in the United Kingdom). Consequently, in such a case, the determination of the carrier frequency is not sufficient to determine the communication mode in a non-ambiguous manner. In order to remove the ambiguity as to the communication mode used, it is for example possible to analyse other parameters of the time signal, until the communication mode used is determined in a non-ambiguous manner or with high probability.

It should be noted that in certain cases, it is possible to receive time signals from a plurality of broadcasting stations 21 using different communication modes, insofar as such stations 21 for broadcasting time signals have very long ranges. The reception of time signals from different broadcasting stations 21 can, in certain cases, allow certain ambiguities to be removed. For example, in the case described above of a time signal received on the carrier frequency 60 kHz, the terminal 12 can be located in or near the following geographic zones: USA, Japan or United Kingdom. However, if the listening module 122 also receives a time signal on the carrier frequency 77.5 kHz, then this means that the terminal 12 is located in the geographic zone EMEA, somewhere between the United Kingdom and Germany, and the communication modes determined correspond to the communications modes MC6-2 and MC3-2.

In the case of ambiguity as to the communication mode used, for example if the carrier frequency 60 kHz of the time signal received does not allow to determine with certainty the communication mode used out of the communication modes MC1-2 (WWVB in the USA), MC5-2 (JJY in Japan) and MC6-2 (MSF in the United Kingdom), then it is possible to analyse other parameters of the time signal. For example, it is possible to analyse the type of modulation used in the time signal, the time and/or frequency rate of the time signal, the format of the data included in the time signal, etc.

During step 53, the control module 123 selects the communication mode to be used in the context of the first wireless communication system 10, according to the communication mode used by the second wireless communication system 20.

Indeed, the communication mode used by the second wireless communication system 20 depends on the geographic zone in which the terminal 12 is located, and can thus be used by the terminal 12 to deduce therefrom the geographic zone in which it is located and, consequently, the communication mode used by the first wireless communication system 10.

For example, the terminal 12 can memorise, in a non-volatile memory, tables corresponding to tables 1 and 2 above. In such a case, the control module 123 determines, on the basis of the communication mode used by the second wireless communication system 20, the geographic zone in which the terminal 12 is located according to the division of the second wireless communication system 20. Then, the control module 123 deduces therefrom the geographic zone in which the terminal 12 is located according to the division of the first wireless communication system 10, and selects the communication mode associated with this geographic zone.

The second wireless communication system 20 is preferably a system serving geographic zones with large dimensions, in such a way that global coverage is obtained by a limited number of geographic zones. Thus, the quantity of information to be memorised in the terminal 12, which corresponds for example to tables 1 and 2 above in the case of a system for broadcasting a time signal for radio-controlled-clock synchronisation, is greatly reduced and can easily be memorised in a non-volatile memory without affecting the cost of the terminal 12.

According to another example, the terminal 12 can memorise, in a non-volatile memory, a table associating, with each communication mode of the second wireless communication system 20, the communication mode to be used in the first wireless communication system 10. Table 3 below gives a non-limiting example of such a table in the case of the communication modes described in reference to tables 1 and 2.

TABLE 3

Correspondence between communication modes

| Communication mode of the second wireless communication system | Communication mode of the first wireless communication system |
|---|---|
| MC1-2 | MC2-1 |
| MC2-2 | MC3-1 |
| MC3-2 | MC1-1 |
| MC4-2 | MC1-1 |
| MC5-2 | MC4-1 |
| MC6-2 | MC1-1 |

Thus, if the second wireless communication system 20 uses the communication mode MC1-2 (USA), then the control module 123 selects the communication mode MC2-1 (USA). If the second wireless communication system 20 uses one of the communication modes MC3-2 (Germany), MC4-2 (Switzerland) and MC6-2 (United Kingdom), then the control module 123 selects the communication mode MC1-1 (EMEA), etc.

More generally, it should be noted that the modes of implementation and embodiments considered above have been described as non-limiting examples, and that other alternatives are consequently possible.

In particular, the invention has been described while only considering communication modes used by a terminal 12 to emit signals over an upstream link, from the terminal 12 to the base stations 11. The invention can also be used, alternatively or in addition, over a downstream link from a base station 11 to terminals 12. In other words, the invention can be applied more generally to the selection, by an emitter device, of a communication mode to be used in order to exchange data with a receiver device of the first wireless communication system 10, wherein said emitter device can be a terminal, a base station, an access point, a remote control or any other type of wireless communication device using different communication modes associated with different respective geographic zones.

Moreover, the invention has been described while considering the case in which the first wireless communication system 10 is ultra-narrow-band. Nothing, however, excludes considering other types for the first wireless communication system 10. It is also possible, for the same terminal 12, to have communication modes that differ by the frequency width of the instantaneous frequency spectrum of the radio-electric signals emitted. In such a case, it is possible for only a portion of the communication modes supported by the terminal 12 to be ultra-narrow-band.

The invention claimed is:

1. A method of selecting, by a transmitter of a first wireless communication system, of a communication mode to be used to exchange data with a receiver of the first wireless communication system, the communication mode being selected from at least two different communication modes associated with different respective geographic zones, the method comprising steps of:
- listening to a second wireless communication system by the transmitter of the first wireless communication system, the second wireless communication system being different from the first wireless communication system, the second wireless communication system comprising at least two different communication modes associated with different geographic zones, said at least two different communication modes of the second wireless communication system being different from said at least two different communication modes of the first wireless communication system;
- determining a communication mode used by the second wireless communication system by the transmitter of the first wireless communication system; and
- selecting the communication mode of the first wireless communication system for exchanging data with the receiver of the first wireless communication system according to the communication mode used by the second wireless communication system; and
- wherein said at least two communication modes of the first wireless communication system differ by at least one of the following parameters:
  - a power of signals emitted by the transmitter;
  - a type of encoding of signals emitted by the transmitter;
  - a type of modulation of signals emitted by the transmitter;
  - a bit rate of data of signals emitted by the transmitter; and
  - a method for accessing a channel on which the data is exchanged between the transmitter and the receiver.

2. The method according to claim 1, wherein the second wireless communication system is a unidirectional broadcast system.

3. The method according to claim 1, wherein the second wireless communication system broadcasts a time signal for radio-controlled-clock synchronisation.

4. The method according to claim 1, wherein the second wireless communication system broadcasts analog or digital television signals.

5. The method according to claim 1, wherein the second wireless communication system broadcasts audio signals via frequency modulation.

6. The method according to claim 1, wherein the second wireless communication system broadcasts a marine or aeronautic beacon signal.

7. A transmitter of a first wireless communication system, comprising a communication module configured to exchange data with a receiver of the first wireless communication system according to at least two different communication modes associated with different respective geographic zones, the transmitter comprising:
- a processor-based listening module configured to listen to a second wireless communication system, the second wireless communication system being different than the first wireless communication system, the second wireless communication system comprising at least two different communication modes associated with different geographic zones, said at least two communication modes of the second wireless communication system being different than said at least two communication modes of the first wireless communication system, the processor-based listening module being further configured to determine the communication mode used by the second wireless communication system;
- a processor-based control module configured to select a communication mode of the communication module according to the communication mode used by the second wireless communication system; and
- wherein said at least two communication modes of the first wireless communication system differ by at least one of the following parameters:
  - a power of signals emitted by the transmitter;
  - a type of encoding of signals emitted by the transmitter;
  - a type of modulation of signals emitted by the transmitter;
  - a bit rate of data of signals emitted by the transmitter; and
  - a method for accessing a channel on which the data is exchanged between the transmitter and the receiver.

8. The transmitter according to claim 7, wherein the second wireless communication system is a unidirectional broadcast system.

9. The transmitter according to claim 7, wherein the processor-based listening module is configured to listen to a system for broadcasting a time signal for radio-controlled-clock synchronisation.

10. The transmitter according to claim 7, wherein the processor-based listening module is configured to listen to a system for broadcasting analog or digital television signals.

11. The transmitter according to claim 7, wherein the processor-based listening module is configured to listen to a system for broadcasting signals via frequency modulation.

12. The transmitter according to claim 7, wherein the processor-based listening module is configured to listen to a system for broadcasting a marine or aeronautic beacon signal.

13. The transmitter according to claim 7, wherein the communication module is configured to emit ultra-narrow-band signals.

* * * * *